H. A. PERKINS.
BELT TIGHTENER.
APPLICATION FILED APR. 20, 1909.

961,005.

Patented June 7, 1910.
2 SHEETS—SHEET 1.

WITNESSES
C. M. Catlin
H. L. Gould

INVENTOR
H. A. Perkins,
BY
Benj. R. Catlin
ATTORNEY

H. A. PERKINS.
BELT TIGHTENER.
APPLICATION FILED APR. 20, 1909.

961,005.

Patented June 7, 1910.
2 SHEETS—SHEET 2.

WITNESSES:
C. M. Catlin
H. L. Gould

INVENTOR
H. A. Perkins,
BY
Benj. R. Catlin
ATTORNEY

UNITED STATES PATENT OFFICE.

HIRAM A. PERKINS, OF ROCHESTER, NEW YORK, ASSIGNOR TO AMERICAN WOOD WORKING MACHINERY CO., OF ROCHESTER, NEW YORK, A CORPORATION OF PENNSYLVANIA.

BELT-TIGHTENER.

961,005.      Specification of Letters Patent.      Patented June 7, 1910.

Application filed April 20, 1909. Serial No. 491,063.

*To all whom it may concern:*

Be it known that I, HIRAM A. PERKINS, a citizen of the United States, residing at Rochester, in the county of Monroe and State of New York, have invented a new and useful Improvement in Belt-Tighteners, of which the following is a specification.

My invention relates more especially to devices for tightening belts used to drive vertical spindles from horizontal shafts, and therefore running at quarter twist, and it consists in a tightener pulley and a supporting arm for it, which is free to swing in the direction of the length of the belt, and also to travel transversely thereto.

It further consists in constructive features which co-act to accomplish these results.

Figure 1:
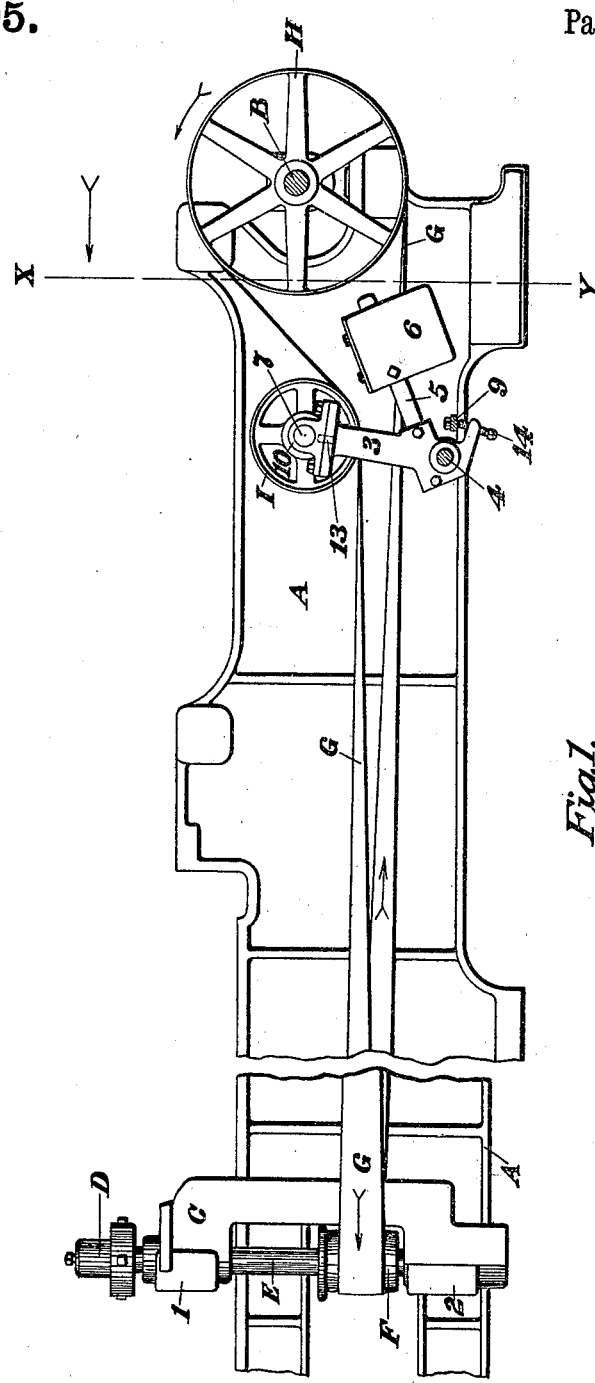
Figure 3:
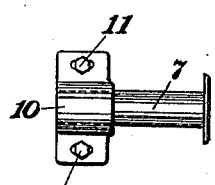
Figure 2:
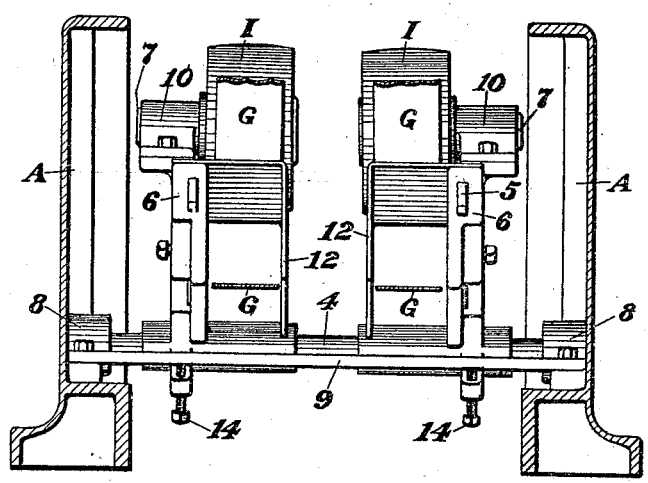

In the accompanying drawings, Figure 1 is a side elevation of my invention; Fig. 2 is a sectional end elevation at line X, Y, of Fig. 1; and Fig. 3 is a detail.

I have shown my invention as applied to a planing and matching machine, of which A is the main frame, B is the driving or countershaft carrying pulleys which support belts through which to operate all the spindles on the machine; C is a frame having boxes, 1, 2, carrying the matcher or jointer spindles E, upon which are mounted pulleys F, and side cutter heads D; H are pulleys on the driving shaft B, which actuate the spindles E by means of quarter-turn belts G. I are idler pulleys for the purpose of guiding and tightening one strand or run of the belts, the direction of motion being indicated by arrows in Fig. 1.

The above mechanism is common to planers and matchers as at present made. It has, however, been the practice heretofore to use the idler pulleys on the lower strand of the belts which is the tight or pulling strand; furthermore the pulleys have formerly been hung on a shaft parallel with the shaft B, and having flat faces of sufficient width to accommodate the belts in whatever transverse position they might run: on account of this construction the belts were subjected to an unequal strain and were liable to slip at times and give uncertain results on the cutter heads, besides tending to break.

On planers of this kind the driving shaft B must always run in the direction indicated in Fig. 1, so as to drive the upper and lower surfacing heads with open or straight belts: therefore I locate crowned faced idlers I, on the slack or upper strand of the belts. Studs 7 are secured rigidly to supporting arms 3, which are fitted to oscillate and slide freely on the stationary shaft 4, extending across the machine. This shaft is secured to the framing A by means of bosses 8 and set screws therein, or in other suitable manner. To each supporting arm 3 is attached a weight arm 5, preferably made of steel or wrought iron, and an adjustable weight 6 is fitted thereto.

On account of the angle taken in running by the upper strand of the quarter turn belts G, it is desirable that the studs 7, carrying the idlers I, should be adjustable to said angles, whereby the belts are made to "track" to the center of the idler pulley faces. I therefore make the arms 3 in two parts as shown in Fig. 1, the upper portion consisting of a hub 10, which is bolted to the main arm. This hub has flanges at its base, and slots therein to receive binding bolts 11, Fig. 3. A central pivot 13, Fig. 1, permits the hub 10 to swing horizontally to a sufficient angle to conform to the running line of the belt. In order to get a proper vertical angle to the studs 7, the bottom of the hubs 10 is dressed to a predetermined angle, this adjustment not being so essential to the practical running of the belts as the horizontal angle.

The weights 6 are hung so as to produce a constant strain on the belts by means of the free oscillation of the arms 3 on the shaft 4, and this may be increased or diminished as required by shifting the weights on levers 5, or varying the amount of weight. It will be observed that the tight or lower strand of the belts returns to the drive pulley above the shaft 4, and the weights 6 are extended downward sufficiently to form a guiding surface acting on the edge of the belts; plates 12 are attached to the weights 6, and shaped to extend over the tight strand of the belt as indicated in Fig. 2, and form the other edge guide for the belt. The weight and guide plate 12 thus make a carrier fork so that when either of the spindles E are adjusted transversely for different widths of material, the belts carry the arms 3 along the shaft 4, and by means of the crowned face of the idlers I the arms are held in that position. By this arrangement the idlers and supporting arms become self-adjusting across the machine, the tension on the belts being constant in all positions.

9 is a bar extending across the machine and secured to the framing.

14 are set screws in projecting ears on the arms 3, so placed as to come in contact with bar 9, and thus prevent the idlers I from being thrown forward by the action of the belts. The bar 9 also prevents the idler arms 3 from swinging backward too far in case of breakage of the belts.

It is evident that other means of following the run of the belt than by the guides formed by the plates 12 and the weights 6 might be used and yet accomplish the same purpose, the construction shown being a simple and inexpensive method of doing it. It might also be desirable to adjust studs 7 vertically as well as horizontally by means of suitable set screws arranged to clamp the stud securely at any required vertical angle; but in practice this is not found necessary.

What I claim as my invention, and desire to secure by Letters Patent, is—

1. The combination with a belt, of a belt tightener comprising an idler pulley adjusted to bear against the belt, a pulley-supporting arm movable transversely and pivoted to swing in a plane substantially parallel to such belt, side guides movable with said arm and embracing the opposite run of the belt from the idler pulley, whereby the arm and idler pulley are moved transversely with the belt as it changes position in the machine.

2. The combination with a belt, of a belt tightener comprising an idler pulley the axis of which is adjustable horizontally to conform to the position assumed by the belt, a pulley-supporting arm pivoted to swing in a plane substantially parallel to the belt, and which is free to adjust itself transversly to such belt, whereby the idler pulley will follow and tension the belt in any transverse position.

3. The combination with a belt, of a belt tightener comprising a pulley-shaft, an idler pulley, a supporting arm carrying said shaft, and constructed to swing in a plane substantially parallel to the belt, and adapted to adjust itself transversely therewith, means acting on said arm for pressing the idler pulley against the belt to give tension thereto, side guides operatively connected to said arm and embracing the belt, whereby when the belt changes its transverse position the supporting arm and idler are carried along with it for the purpose set forth.

4. The combination with a belt, of an idler pulley, a stud or shaft therefor adjustable to correspond with the angular position of the belt, a pulley-supporting arm movable transversely, and pivoted to swing in a plane substantially parallel with said belt, and means for limiting the swing of the supporting arm whatever its transverse position, as set forth.

5. The combination with a belt, of a belt tightener comprising an idler pulley the axis of which is adjustable in relation to the belt, a pulley-supporting arm movable in a plane substantially parallel to said belt, a counterweight on a part extending from said supporting arm and having parts adapted to embrace the belt, whereby the supporting arm and idler will be caused to follow transverse movements of the belt.

6. The combination with a belt having a tight pulling run and a slack run, of a belt tightener comprising an idler pulley resting against such slack run, and means for holding said pulley against the slack run, said belt being transversely adjustable and said tightener pulley being automatically moved transversely with and by said belt.

7. The combination with a belt having a pulling run and a slack run, of a belt tightener comprising an idler pulley resting against one run of said belt, and a weight operatively connected through intervening parts to said idler pulley and holding it against said run of the belt, said belt being transversely adjustable and said tightener pulley being automatically moved transversely with and by said belt.

8. The combination with a belt having a lower tight pulling run and an upper slack run, of a belt tightener comprising an idler pulley resting against said slack run, and means for holding said pulley against the slack run with a constant pressure, said belt being transversely adjustable and said tightener pulley being automatically moved transversely with and by said belt.

9. The combination with a belt, of a belt tightener movable transversely with the belt and comprising an idler pulley having a crown face resting against the loose run of said belt, a pulley-supporting arm, a weight operatively connected to said arm and pulley, and means acting on the other run of the belt from said pulley to cause the latter to follow the belt when it moves transversely.

10. The combination with a belt, of a belt tightener comprising an idler pulley outside the slack run of the belt, pivoted arms connected to move together in a plane substantially parallel to the belt and also transversely movable, one arm supporting the pulley and the other supporting a weight, and parts carried by one of the arms extending beyond the tight run of the belt and engaging the edges thereof.

In testimony whereof I have signed my name to this specification in the presence of two subscribing witnesses.

HIRAM A. PERKINS.

Witnesses:
G. CLARK SOUTHARD,
ARTHUR C. TURPIN.